US 9,306,787 B2

(12) United States Patent
Kamata et al.

(10) Patent No.: US 9,306,787 B2
(45) Date of Patent: Apr. 5, 2016

(54) SIGNAL PROCESSING DEVICE, SIGNAL PROCESSING METHOD, RECEIVING DEVICE, AND RECEIVING METHOD

(71) Applicant: Sony Corporation, Tokyo (JP)

(72) Inventors: Hiroyuki Kamata, Kanagawa (JP); Hidetoshi Kawauchi, Kanagawa (JP); Naoki Yoshimochi, Kanagawa (JP); Kenichi Kobayashi, Tokyo (JP); Kazukuni Takanohashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/402,763

(22) PCT Filed: May 22, 2013

(86) PCT No.: PCT/JP2013/064226
§ 371 (c)(1),
(2) Date: Nov. 21, 2014

(87) PCT Pub. No.: WO2013/179976
PCT Pub. Date: Dec. 5, 2013

(65) Prior Publication Data
US 2015/0146825 A1    May 28, 2015

(30) Foreign Application Priority Data
May 31, 2012 (JP) ................ 2012-124599

(51) Int. Cl.
*H04L 27/26* (2006.01)
*H04J 11/00* (2006.01)
*H04L 7/00* (2006.01)

(52) U.S. Cl.
CPC ............ *H04L 27/265* (2013.01); *H04J 11/00* (2013.01); *H04L 7/0033* (2013.01); *H04L 27/2655* (2013.01); *H04L 27/2657* (2013.01); *H04L 27/2671* (2013.01)

(58) Field of Classification Search
CPC . H04L 27/265; H04L 27/2655; H04L 7/0033; H04L 1/0026; H04L 27/2607; H04L 27/2613; H04L 1/06; H04L 5/0053; H04L 1/0028; H04L 1/0057; H04L 1/0072; H04L 1/1607; H04L 1/1671; H04L 1/1812; H04L 27/2662; H04L 27/2657; H04L 25/022; H04L 25/0224; H04L 27/2676; H04L 27/2679; H04L 5/00; H04L 5/0023; H04L 5/0035; H04L 5/0048
See application file for complete search history.

(56) References Cited

U.S. PATENT DOCUMENTS 7,176,819 B1 * 2/2007 Swerlein ............... H03M 3/322
                                                    341/143
7,340,000 B1 * 3/2008 Hart ................... H04L 25/03146
                                                    375/260

(Continued)

FOREIGN PATENT DOCUMENTS

JP          08223237       *    8/1996

*Primary Examiner* — Hirdepal Singh
(74) *Attorney, Agent, or Firm* — Wolf, Greenfield & Sacks, P.C.

(57) ABSTRACT

There is provided a signal processing device including a first correction processing section that performs first correction on a predetermined signal, an adaptive processing section that performs predetermined adaptive processing on the signal that has been subjected to the first correction, and a second correction processing section that performs second correction, which is reverse correction of the first correction, on the signal that has been subjected to the adaptive processing, in accordance with the amount of delay in the adaptive processing.

10 Claims, 11 Drawing Sheets

(56) References Cited

U.S. PATENT DOCUMENTS

| | | | |
|---|---|---|---|
| 8,731,121 B2* | 5/2014 | Lopez | H04L 25/0224 375/316 |
| 2006/0140308 A1* | 6/2006 | MacFarlane Shearer et al. | H04L 27/2657 375/326 |
| 2007/0195909 A1* | 8/2007 | Ishikawa | H03G 7/00 375/285 |
| 2010/0102889 A1* | 4/2010 | Azenkot | H04B 1/7183 331/17 |
| 2010/0285736 A1* | 11/2010 | Gore | H04B 7/15535 455/7 |
| 2011/0019782 A1* | 1/2011 | Kobayashi et al. | 375/344 |
| 2012/0210191 A1* | 8/2012 | Tokoro et al. | 714/756 |

* cited by examiner

SIGNAL PROCESSING DEVICE, SIGNAL PROCESSING METHOD, RECEIVING DEVICE, AND RECEIVING METHOD

CROSS REFERENCE TO RELATED APPLICATIONS

This is a U.S. National Stage Application under 35 U.S.C. §371, based on International Application No. PCT/JP2013/064226, filed May 22, 2013, which claims priority to Japanese Patent Application JP 2012-124599, filed May 31, 2012, each of which is hereby incorporated by reference in its entirety.

TECHNICAL FIELD

The present technology relates to a signal processing device, a signal processing method, a receiving device, and a receiving method, and in particular relates to a signal processing device, a signal processing method, a receiving device, and a receiving method for outputting a signal seamlessly at the time of shortening a loop delay in a feedback loop.

BACKGROUND ART

Some types of electronic devices include a feedback loop circuit (e.g., refer to Patent Literature 1). In addition, some feedback loop circuits of this type include an adaptive processing section that performs predetermined adaptive processing in the feedback loop.

FIG. 1 is a diagram illustrating a conventional feedback loop circuit, which includes an adaptive processing section. In FIG. 1, an adder 11, an adaptive processing section 12, a selector 13, a first processing section 14, and a second processing section 15 are disposed in an identical feedback loop, forming the feedback loop circuit. In addition, this feedback loop circuit includes a route for bypassing the adaptive processing section 12, the route which can be selected by the selector 13.

In the feedback loop circuit in FIG. 1, when the selector 13 selects the adaptive processing section 12 side, a loop delay is the sum of a processing period of time in the adaptive processing section 12, and processing periods of time in the first processing section 14 and the second processing section 15.

In addition, a process is performed to determine whether or not the state of adaptive processing in the adaptive processing section 12 is effective, and when the state of the adaptive processing is considered to be substantially ineffective, the selector 13 is to select the route side by which the adaptive processing is bypassed. In this case, the loop delay is the sum of processing periods of time in the first processing section 14 and the second processing section 15, and it is thus possible to shorten the loop delay as compared with the case where the adaptive processing section 12 side is selected.

CITATION LIST

Patent Literature

Patent Literature 1: JP 2002-094585A

SUMMARY OF INVENTION

Technical Problem

However, in the conventional feedback loop circuit, since the process is performed to determine whether or not the state of the adaptive processing in the adaptive processing section 12 is effective, and the route is switched according to the determination result, the loop delay in the feedback loop is dynamically switched.

Thus, it is not possible to output signals seamlessly, and there is a demand not only for shortening a loop delay in a feedback loop circuit but also for performing seamless signal output.

The present technology is made in view of such a circumstance, and allows for outputting signals seamlessly at the time of shortening a loop delay in a feedback loop.

Solution to Problem

According to a first aspect of the present disclosure, there is provided a signal processing device including a first correction processing section that performs first correction on a predetermined signal, an adaptive processing section that performs predetermined adaptive processing on the signal that has been subjected to the first correction, and a second correction processing section that performs second correction, which is reverse correction of the first correction, on the signal that has been subjected to the adaptive processing, in accordance with the amount of delay in the adaptive processing.

The first correction processing section, the adaptive processing section, and the second correction processing section are disposed in an identical feedback loop, and the amount of delay in the feedback loop is adjusted according to an adaptation state in the adaptive processing.

One or more processing sections each of which performs predetermined signal processing are further included, and the processing sections are disposed in the feedback loop.

In a case where the adaptive processing does not include manipulation processing of the signal, the amount of delay in the feedback loop is shortened as compared with a case where the adaptive processing includes the manipulation processing of the signal.

The signal processing device of the first aspect of the present technology may be an independent device or may be an internal block being a constituent of one device.

A signal processing method of the first aspect of the present technology is a signal processing method corresponding to the above-described signal processing device of the first aspect of the present technology.

In the signal processing device and the signal processing method of the first aspect of the present technology, a predetermined signal is subjected to first correction, the signal subjected to the first correction is subjected to predetermined adaptive processing, and the signal subjected to the adaptive processing is subjected to second correction, which is the reverse correction of the first correction, in accordance with the amount of delay in the adaptive processing.

According to a second aspect of the present disclosure, there is provided a receiving device including a first correction processing section that performs first frequency correction on an orthogonal frequency division multiplexing (OFDM) signal, a time domain adaptive processing section that performs time domain adaptive processing, which is adaptive processing in a time domain, on the OFDM signal that has been subjected to the first frequency correction, and a second correction processing section that performs second frequency correction, which is reverse correction of the first frequency correction, on the OFDM signal that has been subjected to the time domain adaptive processing, in accordance with the amount of delay in the time domain adaptive processing.

The first correction processing section, the time domain adaptive processing section, and the second correction processing section are disposed in an identical feedback loop, and the amount of delay in the feedback loop is adjusted according to an adaptation state in the time domain adaptive processing.

An FFT calculating section that converts the OFDM signal that has been subjected to the second correction processing from a time domain into a frequency domain, a frequency-domain frequency-error detecting section that detects a frequency error in the frequency domain contained in the OFDM signal, and a frequency correcting value generating section that generates a frequency correcting value in accordance with the detected frequency error are further included. The FFT calculating section, the frequency-domain frequency-error detecting section, and the frequency correcting value generating section are disposed in the feedback loop. The first correction processing section performs the first frequency correction on the basis of the generated frequency correcting value.

In a case where the time domain adaptive processing does not include the adaptive processing in the time domain on the OFDM signal, the amount of delay in the feedback loop is shortened as compared with a case where the time domain adaptive processing includes the adaptive processing in the time domain on the OFDM signal.

The receiving device of the second aspect of the present technology may be an independent device, or may be an internal block being a constituent of one device.

A receiving method of the second aspect of the present technology is a receiving method corresponding to the above-described receiving device of the second aspect of the present technology.

In the receiving device and the receiving method of the second aspect of the present technology, an OFDM signal is subjected to first frequency correction, the OFDM signal subjected to the first frequency correction is subjected to time domain adaptive processing, which is adaptive processing in a time domain, and the OFDM signal subjected to the time domain adaptive processing is subjected to second frequency correction, which is the reverse correction of the first frequency correction, in accordance with the amount of delay in the time domain adaptive processing.

Advantageous Effects of Invention

According to the first aspect and the second aspect of the present technology, it is possible to shorten a loop delay in a feedback loop, and to perform seamless signal output.

DESCRIPTION OF EMBODIMENTS

An embodiment of the present technology will be described below with reference to the drawings.

[Configuration Example Of Signal Processing Device]

Figure 1:
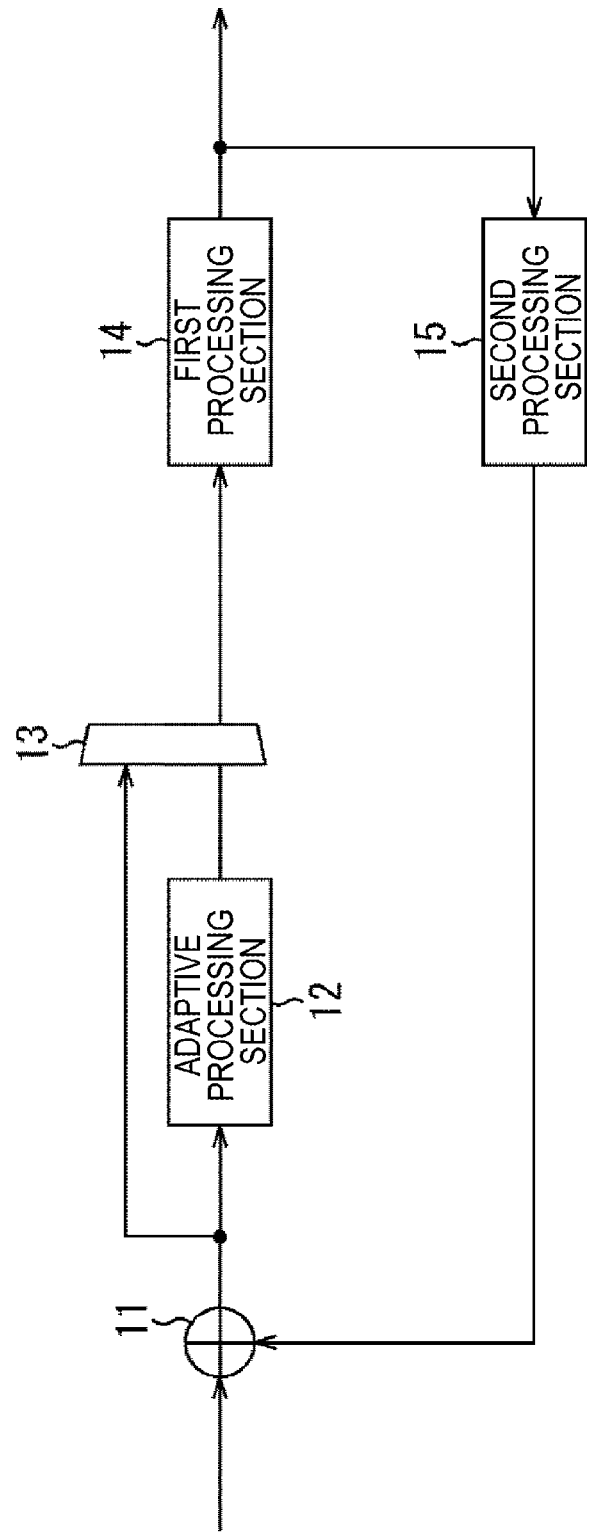
FIG. 1 is a diagram illustrating the configuration of a conventional feedback loop circuit.
Figure 2:
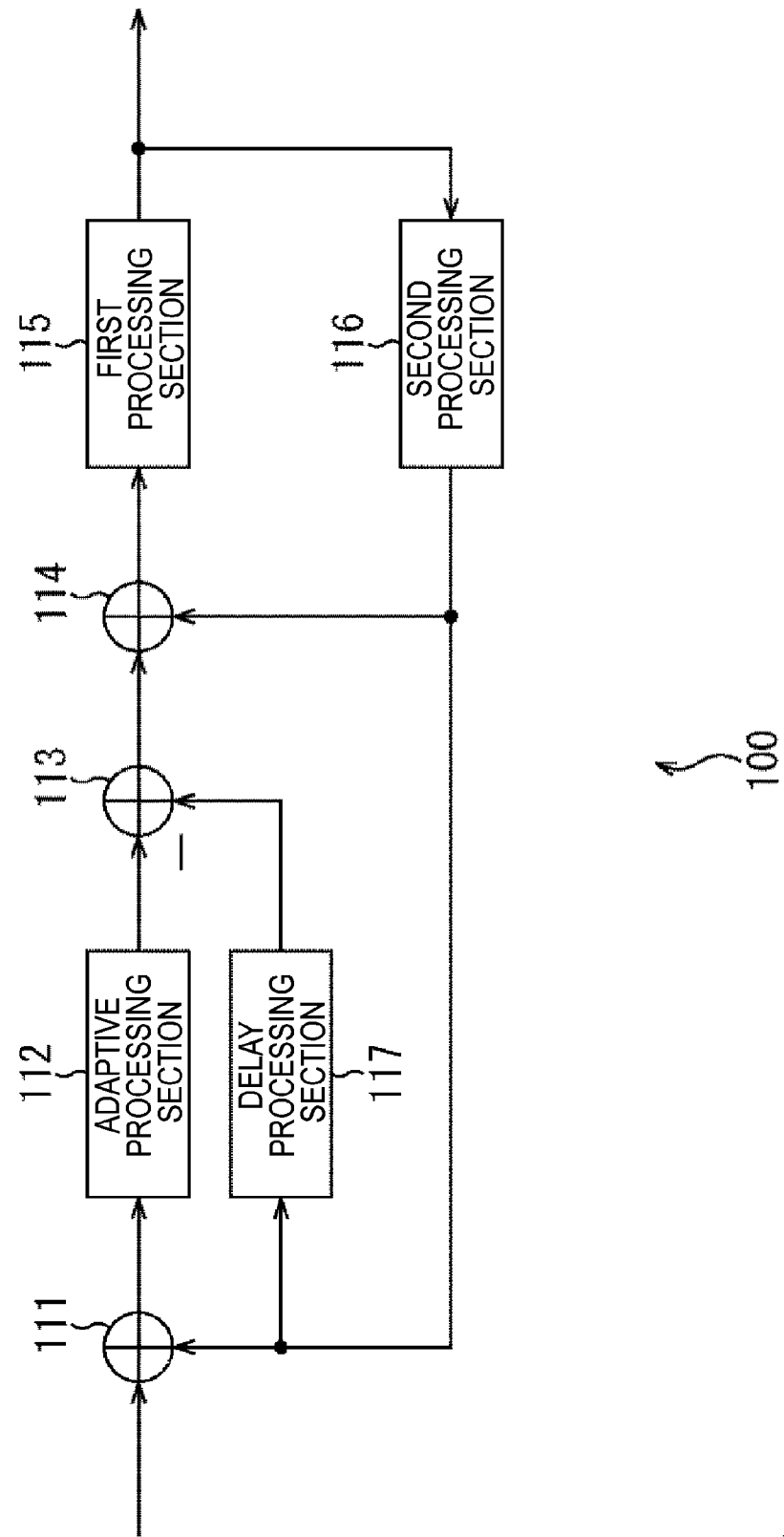
FIG. 2 is a diagram illustrating the configuration of one embodiment of a signal processing device to which the present technology is applied.

FIG. 2 is a diagram illustrating the configuration of a signal processing device of one embodiment of the present technology.

As illustrated in FIG. 2, a signal processing device 100 includes an adder 111, an adaptive processing section 112, an adder 113, an adder 114, a first processing section 115, a second processing section 116, and a delay processing section 117.

The adder 111 adds a signal provided from the second processing section 116 to a signal input from a circuit (not illustrated) in the previous stage, to perform first correction processing, and provides the signal thereby obtained to the adaptive processing section 112.

The adaptive processing section 112 subjects the signal provided from the adder 111, which has been subjected to the first correction processing, to predetermined adaptive processing, and provides the signal thereby obtained to the adder 113. Note that the adaptive processing is a process the content of which changes dynamically, such as a process of manipulating a signal in accordance with optional coefficients.

The adder 113 is supplied with the signal from the adaptive processing section 112, which has been subjected to the adaptive processing, and the signal from the delay processing section 117, which has been subjected to delay processing. Note that the signal subjected to the delay processing is the same as the signal provided to the adder 111, the signal subjected to delay that is the same as a processing delay in the adaptive processing section 112.

The adder 113 performs second correction processing, which is the reverse correction of the first correction processing, of negatively adding the signal from the delay processing section 117 to the signal from the adaptive processing section 112, and provides the signal thereby obtained to the adder 114.

The adder 114 adds the signal provided from the second processing section 116 to the signal provided from the adder 113, and provides the signal thereby obtained to the first processing section 115.

The first processing section 115 subjects the signal provided from the adder 114 to first signal processing and provides the signal thereby obtained to the subsequent circuit (not illustrated) and the second processing section 116. Note that the first signal processing is a fixed process such as fast Fourier transform (FFT), the content of which does not change dynamically.

The second processing section 116 is supplied with the signal subjected to the first signal processing by the first processing section 115. The second processing section 116 subjects the signal provided from the first processing section 115 to second signal processing, and provides the signal thereby obtained to the adder 111, the adder 114, and the delay processing section 117. Note that the second signal processing is a fixed process the content of which does not change dynamically, as with the above-described first signal processing.

The delay processing section 117 subjects the signal provided from the second processing section 116 to predetermined delay processing, and provides the signal thereby obtained to the adder 113. Note that the delay processing is a process of delaying the signal from the second processing section 116 to the same extent as the processing delay in the adaptive processing section 112.

The signal processing device 100 is configured as described above.

[Operating Principle of the Present Technology]

By having the configuration in FIG. 2, the signal processing device 100 can make correction processing substantially ineffective in the case where the adaptation state of the adaptive processing can be considered to be delay only. In addition, the signal processing device 100 operates while a feedback loop is automatically switched according to the adaptation state of the adaptive processing, and thus no process for determining the adaptation state is needed and further no process of switching the processes is needed, which allows a seamless operation to be performed. Hereafter, the operating principle of the present technology will be described with reference to FIG. 3 to FIG. 7.

Figure 3:
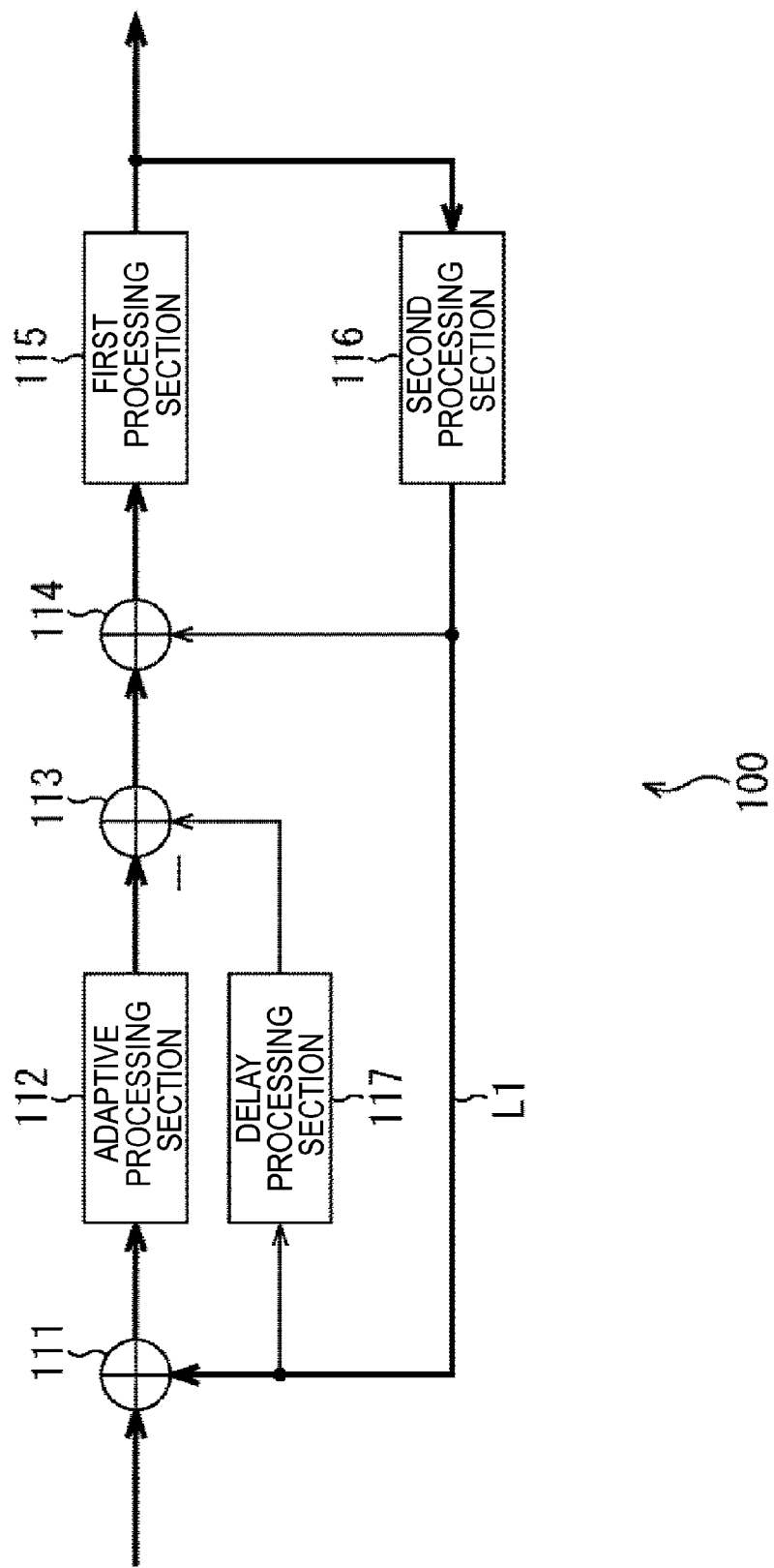
FIG. 3 is a diagram illustrating a loop delay in the case where adaptive processing is in an effective state.

As illustrated in FIG. 3, in the case where the adaptive processing in the adaptive processing section 112 is effective and includes a process of manipulating an input signal, the feedback loop operates with a loop delay in an outer loop L1 (thick lines in the drawing). The loop delay at this point is a period of time being the sum of processing periods of time of the adaptive processing in the adaptive processing section 112, the first signal processing in the first processing section 115, and the second signal processing in the second processing section 116.

In contrast, in the case where the adaptive processing in the adaptive processing section 112 is only to delay an input signal and is in a substantially ineffective state without including a process of manipulating a signal, the adaptive processing can be considered to be delay that is the same as that of the adaptive processing.

Figure 4:
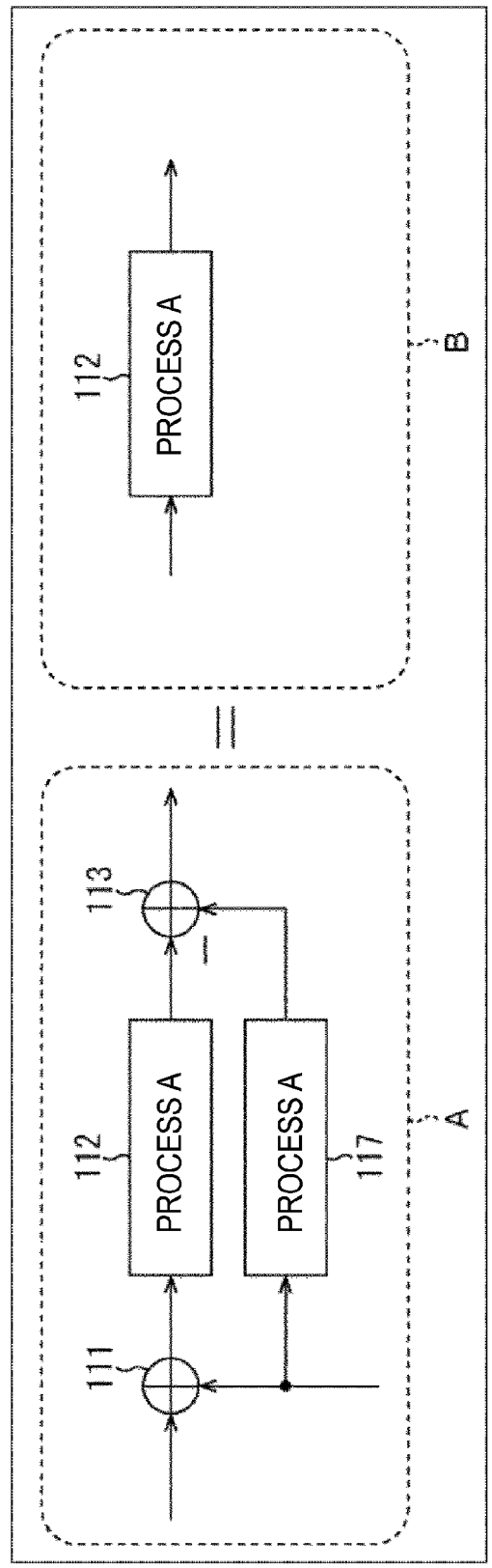
FIG. 4 is a diagram illustrating the case where the adaptive processing is considered to be delay.

That is, as illustrated in FIG. 4, in the case where the adaptive processing section 112 performs a process A and the delay processing section 117 delays a correcting value according to the process A, the correcting value corrected in the adder 111 is subjected to the reverse correction in the adder 113 when the process A as the adaptive processing is brought into the substantially ineffective state, which allows a circuit configuration A to be regarded as a circuit configuration B.

Figure 5:
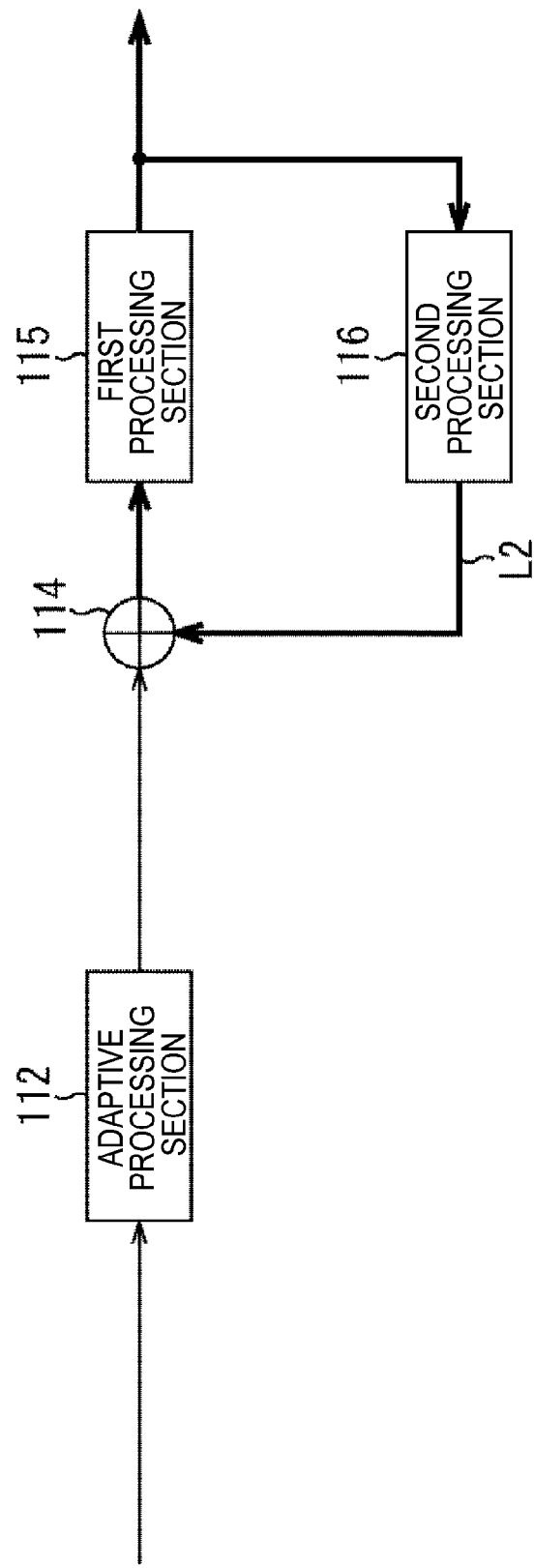
FIG. 5 is a diagram illustrating a loop delay in the case where the adaptive processing is considered to be delay.

Then, the adaptive processing in the adaptive processing section 112 has a relationship in FIG. 4 in the case of being in the substantially ineffective state, and thus, as illustrated in FIG. 5, the adaptive processing can be equivalently considered to be a process outside the feedback loop. In addition, in this case, the feedback loop operates with a loop delay in an inner loop L2 (thick lines in the drawing). The loop delay at this point is a period of time being the sum of the processing periods of time of the first signal processing in the first processing section 115 and the second signal processing in the second processing section 116.

Figure 6:
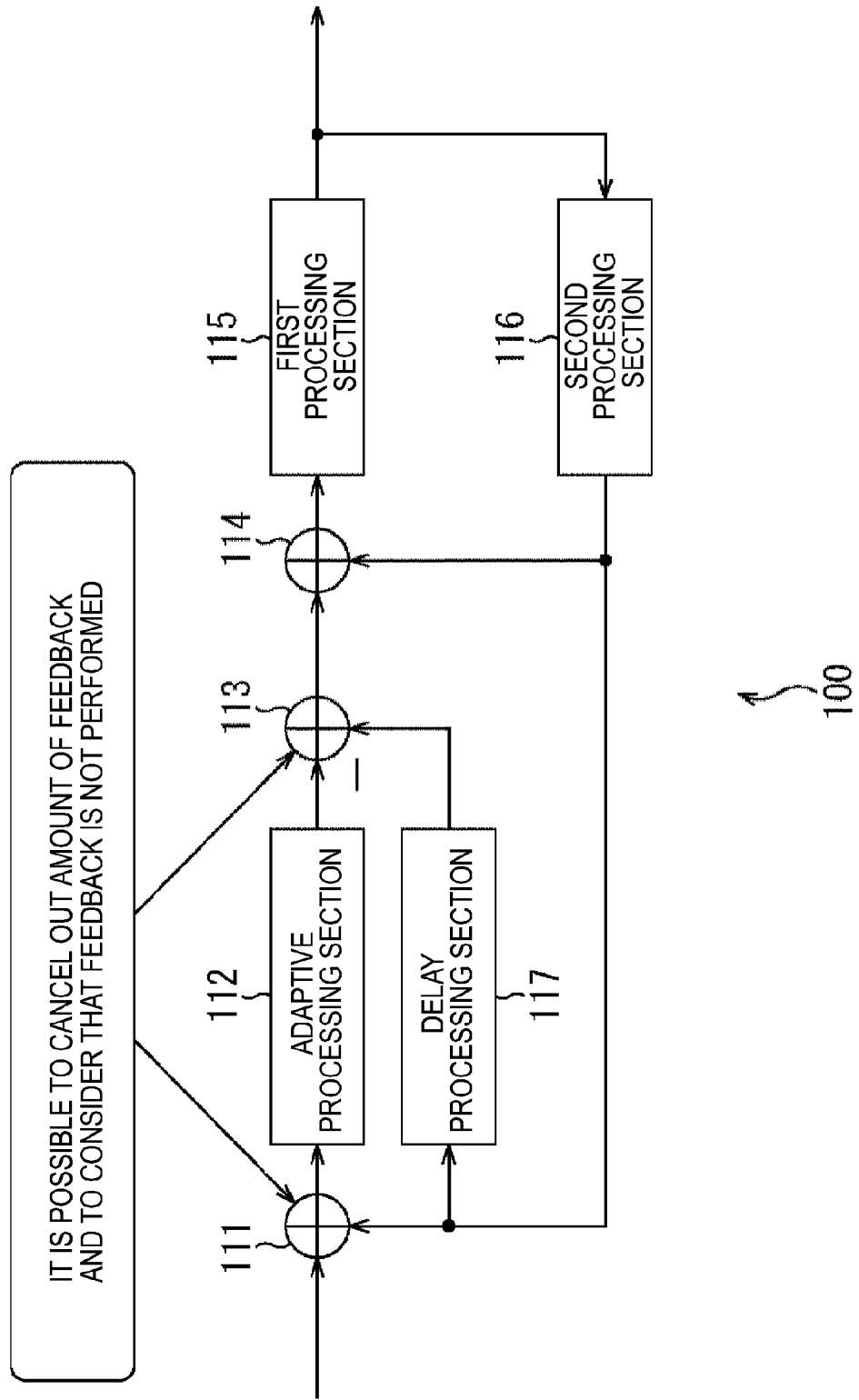
FIG. 6 is a diagram illustrating how the amount of feedback is cancelled out.

In addition, the above-described relationship is as illustrated in FIG. 6 when viewing the signal processing device 100 as a whole. That is, in the signal processing device 100, in the case where the adaptive processing in the adaptive processing section 112 is in the substantially ineffective state and can be considered to be delay similar to that in the adaptive processing, the first correction processing by the adder 111 and the second correction processing by the adder 113 cancels out the amount of feedback, and it can be considered that the feedback is not performed.

Figure 7:
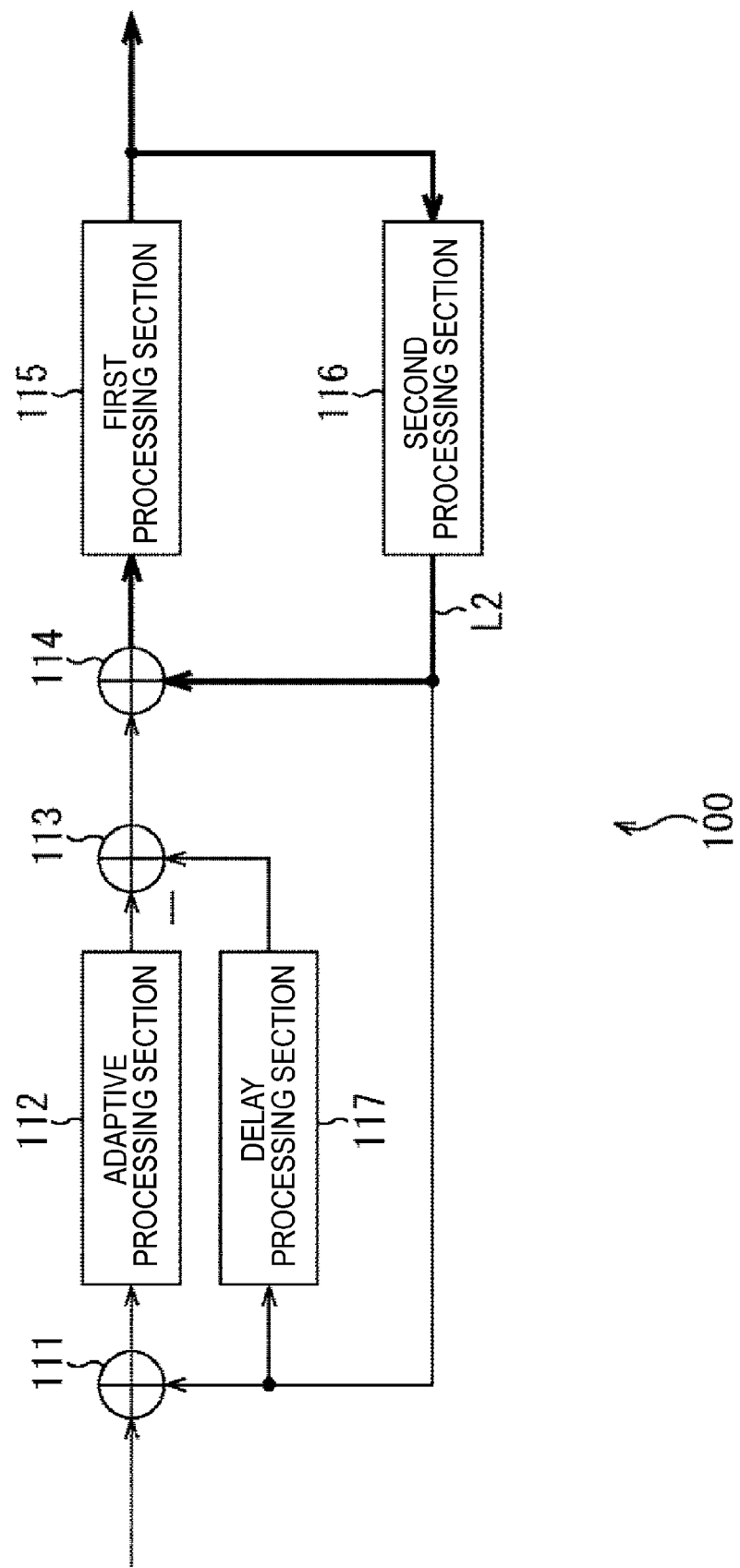
FIG. 7 is a diagram illustrating a loop delay in the case where the adaptive processing is in a substantially ineffective state.

In this case, as illustrated in FIG. 7, in the signal processing device 100, the feedback loop operates with the loop delay in the inner loop L2 (thick lines in the drawings). At this point, since the loop delay is a period of time being the sum of processing periods of time of the first signal processing and the second signal processing, it is possible to shorten the loop delay as compared with the period of time in the case of operating with the loop delay in the outer loop L1 (FIG. 3).

The above is summarized as follows. That is, in the case where the adaptive processing in the adaptive processing section 112 is in an effective state and includes manipulation processing of a signal, the feedback loop is to operate with the loop delay in the outer loop L1, as illustrated in FIG. 3. In contrast, in the case where the adaptive processing in the adaptive processing section 112 is only to delay a signal and is in the substantially ineffective state without including the manipulation processing of a signal, the feedback loop is to operate with the loop delay in the inner loop L2, as illustrated in FIG. 7.

Thereby, in the case where the adaptive processing in the adaptive processing section 112 is in the substantially ineffective state, it is possible to shorten the loop delay in the feedback loop.

In addition, in the case where the adaptive processing in the adaptive processing section 112 is changed from the effective state to the substantially ineffective state, the feedback loop is to operate while the loop delay is automatically switched from the loop L1 to the loop L2 by the loop properties. In addition, to the contrary, in the case where the adaptive processing is changed from the substantially ineffective state to the effective state, the loop delay is to be automatically switched from the loop L2 to the loop L1.

Therefore, in the signal processing device 100, at the time of shortening the loop delay in the feedback loop, a process of determining the adaptation state of the adaptive processing is not needed, and further a process of switching the processes is not needed, either. As a result, the signal processing device 100 can output signals subjected to predetermined signal processing while switching the loop delay seamlessly.

The operating principle of the present technology has been described above.

[Specific Application Example of the Present Technology]

Now, in recent years, as a system for transmitting digital signals, a modulation method called orthogonal frequency division multiplexing (OFDM) is used. This OFDM system is a system that prepares many subcarriers orthogonal to one another in a transmission band, allocates data to the amplitude and phase of each subcarrier, and performs digital modulation in phase shift keying (PSK) or quadrature amplitude modulation (QAM).

The OFDM system is often applied to digital terrestrial broadcasting that is significantly influenced by multipath interference. The digital terrestrial broadcasting for which such an OFDM system is adopted includes standards such as digital video broadcasting-terrestrial (DVB-T) and integrated services digital broadcasting-terrestrial (ISDB-T).

In addition, European telecommunication standard institute (ETSI) standardizes digital video broadcasting (DVB)-T.2 as a standard of a next-generation digital terrestrial broadcasting.

The present technology can be applied to a feedback loop (hereafter, referred to as frequency error correction loop) for correcting a frequency error in an OFDM signal in demodulating processing that is performed by a receiver supporting DVB-T2. Thus, shortening a loop delay in the frequency error correction loop will be next described with reference to FIG. 8 to FIG. 11, as a specific application example of the present technology.

[Configuration Example of Receiving Device]

Figure 8:
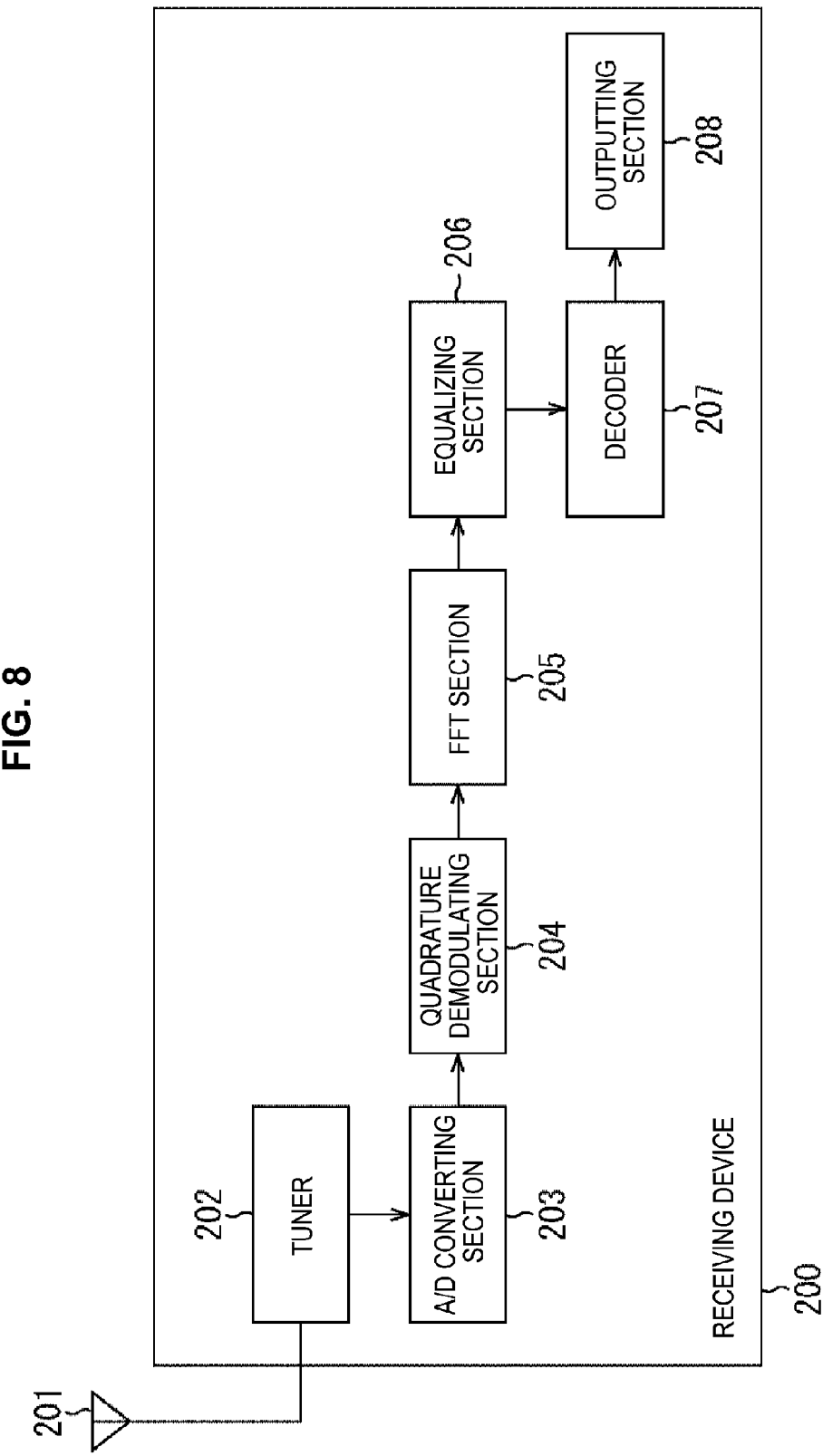
FIG. 8 is a diagram illustrating the configuration of one embodiment of a receiving device to which the present technology is applied.

FIG. 8 is a diagram illustrating the configuration of one embodiment of a receiving device to which the present technology is applied.

A receiving device 200 is a receiver supporting the DVB-T2 standard. The receiving device 200 includes an antenna 201, a tuner 202, an A/D converting section 203, a quadrature demodulating section 204, an FFT section 205, an equalizing section 206, a decoder 207, and an outputting section 208.

The antenna 201 receives an OFDM signal transmitted from a transmitter installed in a broadcasting station via a transmission path, and provides the OFDM signal to the tuner 202. The tuner 202 subjects the OFDM signal received by the antenna 201 to processing such as frequency conversion, and provides the OFDM signal to the A/D converting section 203.

The A/D converting section 203 amplifies or attenuates the gain of the OFDM signal provided from the tuner 202, and subjects the OFDM signal to analog/digital (A/D) conversion processing to convert the OFDM signal from an analog signal into a digital signal. The A/D converting section 203 provides the OFDM signal converted into the digital signal to the quadrature demodulating section 204.

The quadrature demodulating section 204 subjects the OFDM signal provided from the A/D converting section 203 to quadrature demodulation using a carrier signal having a predetermined frequency, and provides the OFDM signal being a baseband signal thereby obtained to the FFT section 205.

The FFT section 205 subjects the OFDM signal provided from the quadrature demodulating section 204 to fast Fourier transform (FFT), and provides the OFDM signal to the equalizing section 206. Note that the FFT section 205 corrects the frequency error in the OFDM signal using the frequency error correction loop, which will be described hereafter in detail.

The equalizing section 206 corrects the distortion of the OFDM signal provided from the FFT section 205 to equalize the OFDM signal. The OFDM signal equalized by the equalizing section 206 is restored by being subjected to demapping processing, and is provided to the decoder 207 as demodulated data.

The decoder 207 decodes the encoded data provided from the equalizing section 206 using, for example, moving picture experts group (MPEG) decoding, and provides the resulting image or sound data to the outputting section 208.

The outputting section 208 outputs the image or sound data provided from the decoder 207.

The receiving device 200 is configured as described above.

(Configuration Example of FFT Section)

Figure 9:
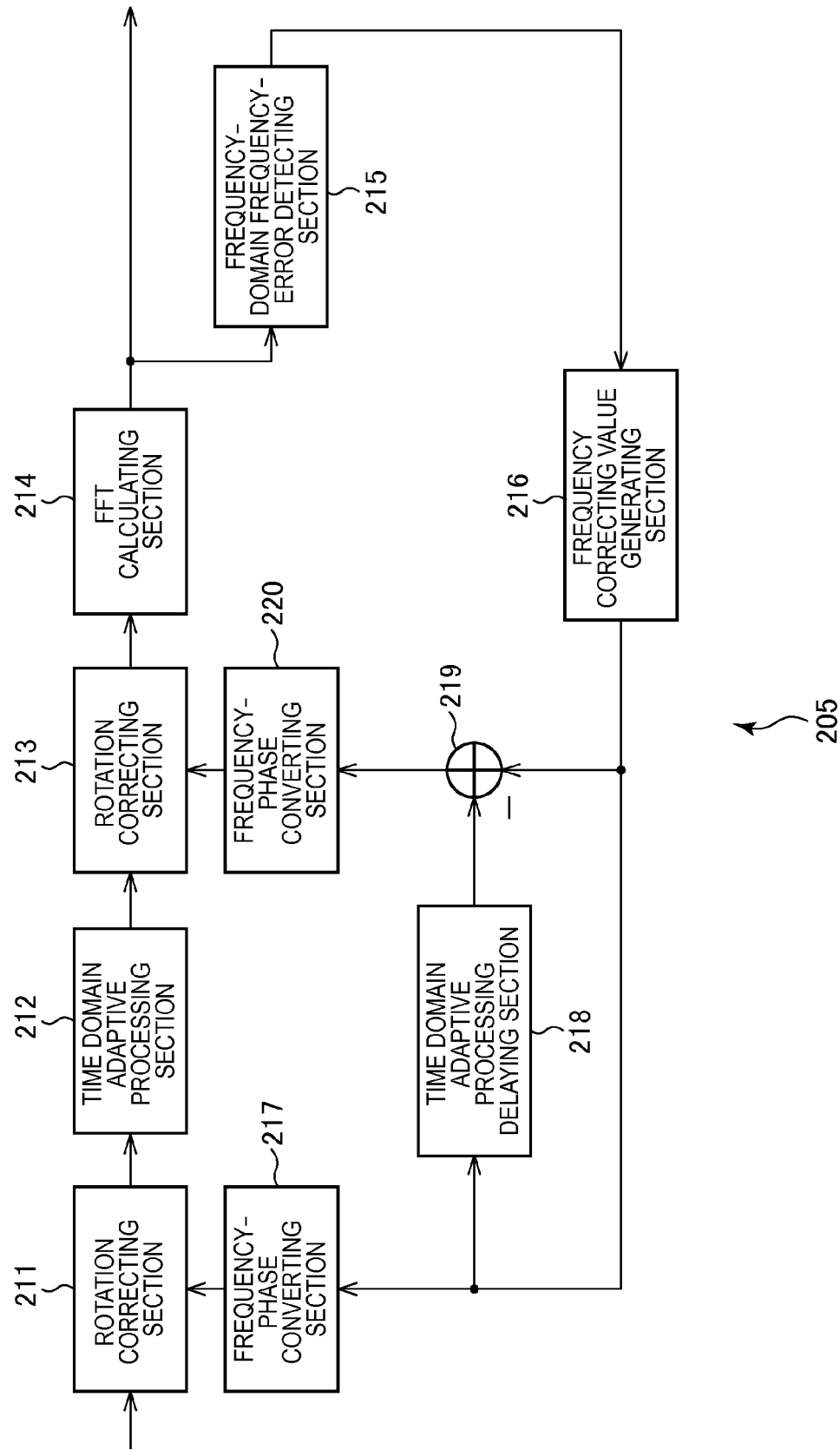
FIG. 9 is a diagram illustrating an FFT section in detail.

FIG. 9 illustrates a configuration example of the FFT section 205 in FIG. 8.

As illustrated in FIG. 9, the FFT section 205 includes a rotation correcting section 211, a time domain adaptive processing section 212, a rotation correcting section 213, an FFT calculating section 214, a frequency-domain frequency-error detecting section 215, a frequency correcting value generating section 216, a frequency-phase converting section 217, a time domain adaptive processing delaying section 218, an adder 219, and a frequency-phase converting section 220. In addition, the sections including from the rotation correcting section 211 to the frequency-phase converting section 220 are to configure the frequency error correction loop.

The OFDM signal in a time domain, being a baseband signal obtained through the quadrature modulation by the quadrature demodulating section 204 in the previous stage, is provided to the rotation correcting section 211.

The rotation correcting section 211 performs rotation correction to a frequency error contained in the OFDM signal provided from the quadrature demodulating section 204 in accordance with a frequency correcting value provided from the frequency-phase converting section 217. The rotation correcting section 211 provides the corrected OFDM signal in the time domain to the time domain adaptive processing section 212.

The time domain adaptive processing section 212 subjects the OFDM signal in the time domain provided from the rotation correcting section 211 to time domain adaptive processing. The time domain adaptive processing section 212 provides the OFDM signal subjected to the time domain adaptive processing to the rotation correcting section 213.

Here, the adaptive processing is performed in the time domain in order to perform the correction to a disturbance that is difficult to correct in a frequency domain.

The rotation correcting section 213 performs rotation correction to the frequency error contained in the OFDM signal provided from the time domain adaptive processing section 212 in accordance with a frequency correcting value provided from the frequency-phase converting section 220. The rotation correcting section 213 provides the corrected OFDM signal to the FFT calculating section 214.

The FFT calculating section 214 subjects the OFDM signal provided from the rotation correcting section 213 to Fast Fourier Transform, and provides the OFDM signal in the frequency domain thereby obtained to the equalizing section 206 in the subsequent stage and the frequency-domain frequency-error detecting section 215.

The frequency-domain frequency-error detecting section 215 estimates the frequency error contained in the OFDM signal in the frequency domain provided from the FFT calculating section 214. This frequency error estimate is estimated on the basis of, for example, a phase difference between pilot symbols in OFDM. The frequency-domain frequency-error detecting section 215 provides the estimated frequency error estimate to the frequency correcting value generating section 216.

The frequency correcting value generating section 216 generates a frequency correcting value on the basis of the frequency error estimate provided from the frequency-domain frequency-error detecting section 215. The frequency correcting value generating section 216 provides the generated frequency correcting value to the frequency-phase converting section 217 and the time domain adaptive processing delaying section 218, and to the frequency-phase converting section 220 via the adder 219.

The frequency-phase converting section 217 converts the frequency correcting value provided from the frequency correcting value generating section 216 under a predetermined conversion rule. The frequency-phase converting section 217 provides the converted frequency correcting value to the rotation correcting section 211.

The time domain adaptive processing delaying section 218 delays the frequency correcting value provided from the frequency correcting value generating section 216 by a processing delay that is the same as that in the time domain adaptive processing section 212. The delayed frequency correcting value is provided to the frequency-phase converting section 220 via the adder 219.

The frequency-phase converting section 220 converts the frequency correcting value provided via the adder 219 under a predetermined conversion rule. The frequency-phase converting section 220 provides the converted frequency correcting value to the rotation correcting section 213.

The FFT section 205 is configured as described above.
(Loop Delay in Frequency Error Correction Loop)

In the frequency error correction loop in FIG. 9, the time domain adaptive processing section 212 is equivalent to the adaptive processing section 112 in FIG. 2, and the time domain adaptive processing delaying section 218 is equivalent to the delay processing section 117 in FIG. 2. In addition, the rotation correcting section 211 and the frequency-phase converting section 217 are equivalent to the adder 111 in FIG. 2, and the rotation correcting section 213, the adder 219, and the frequency-phase converting section 220 are equivalent to the adder 113 or the adder 114 in FIG. 2. Furthermore, the FFT calculating section 214 is equivalent to the first processing section 115 in FIG. 2, and the frequency-domain frequency-error detecting section 215 and the frequency correcting value generating section 216 are equivalent to the second processing section 116 in FIG. 2.

That is, in the frequency error correction loop in FIG. 9, as with the feedback loop in FIG. 2, the frequency correcting value corrected by the rotation correcting section 211 is to be subjected to the reverse correction by the rotation correcting section 213. Then, in the case where the time domain adaptive processing in time domain adaptive processing section 212 is in a substantially ineffective state and can be considered as delay, the amount of feedback is cancelled out and it can be considered that the feedback is not performed.

Figure 10:
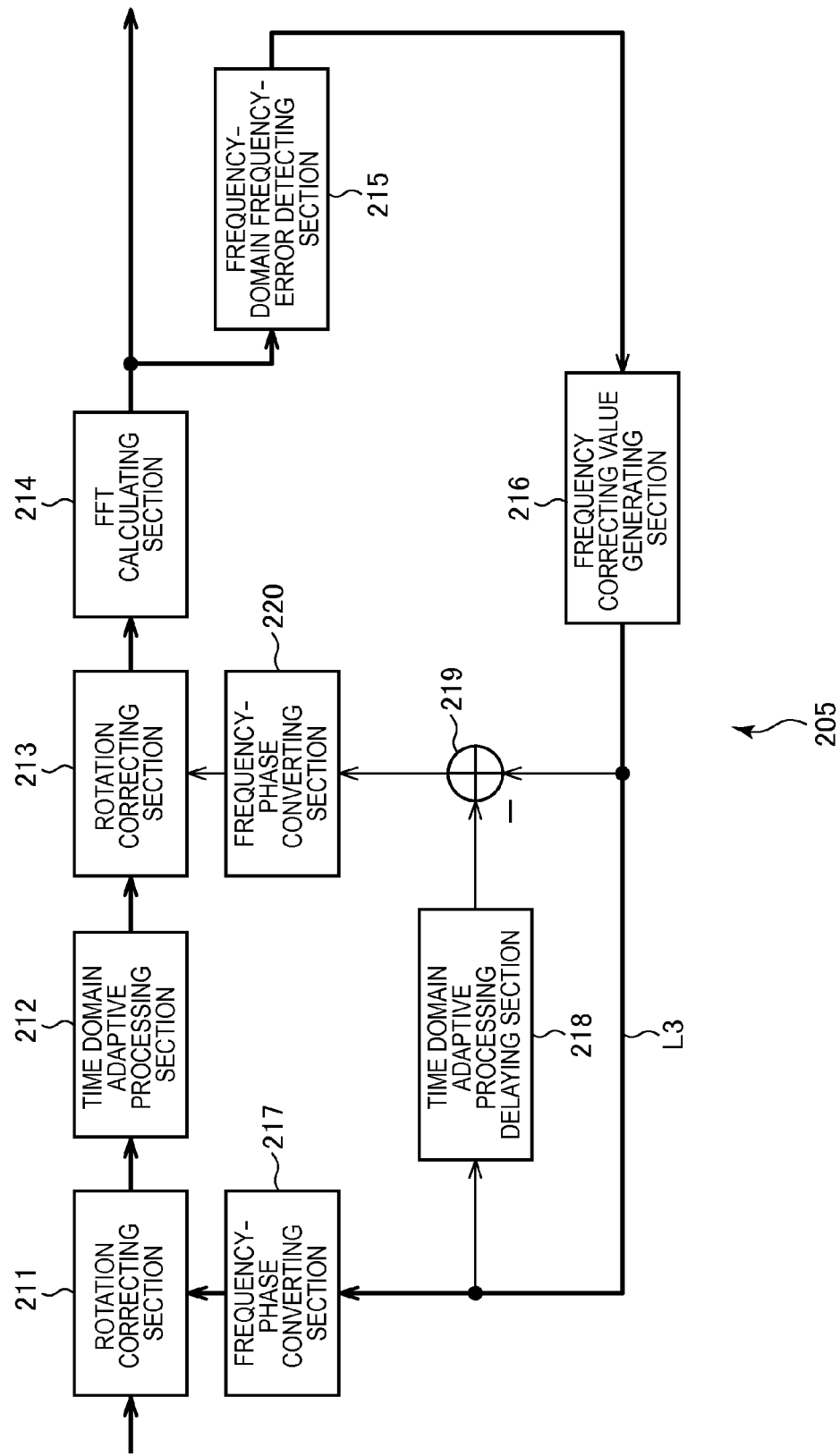
FIG. 10 is a diagram illustrating a loop delay in the case where time domain adaptive processing is in an effective state.

Specifically, as illustrated in FIG. 10, the frequency error correction loop operates with a loop delay in an outer loop L3 (thick lines in the drawing) in the case where the time domain adaptive processing is in an effective state.

Figure 11:
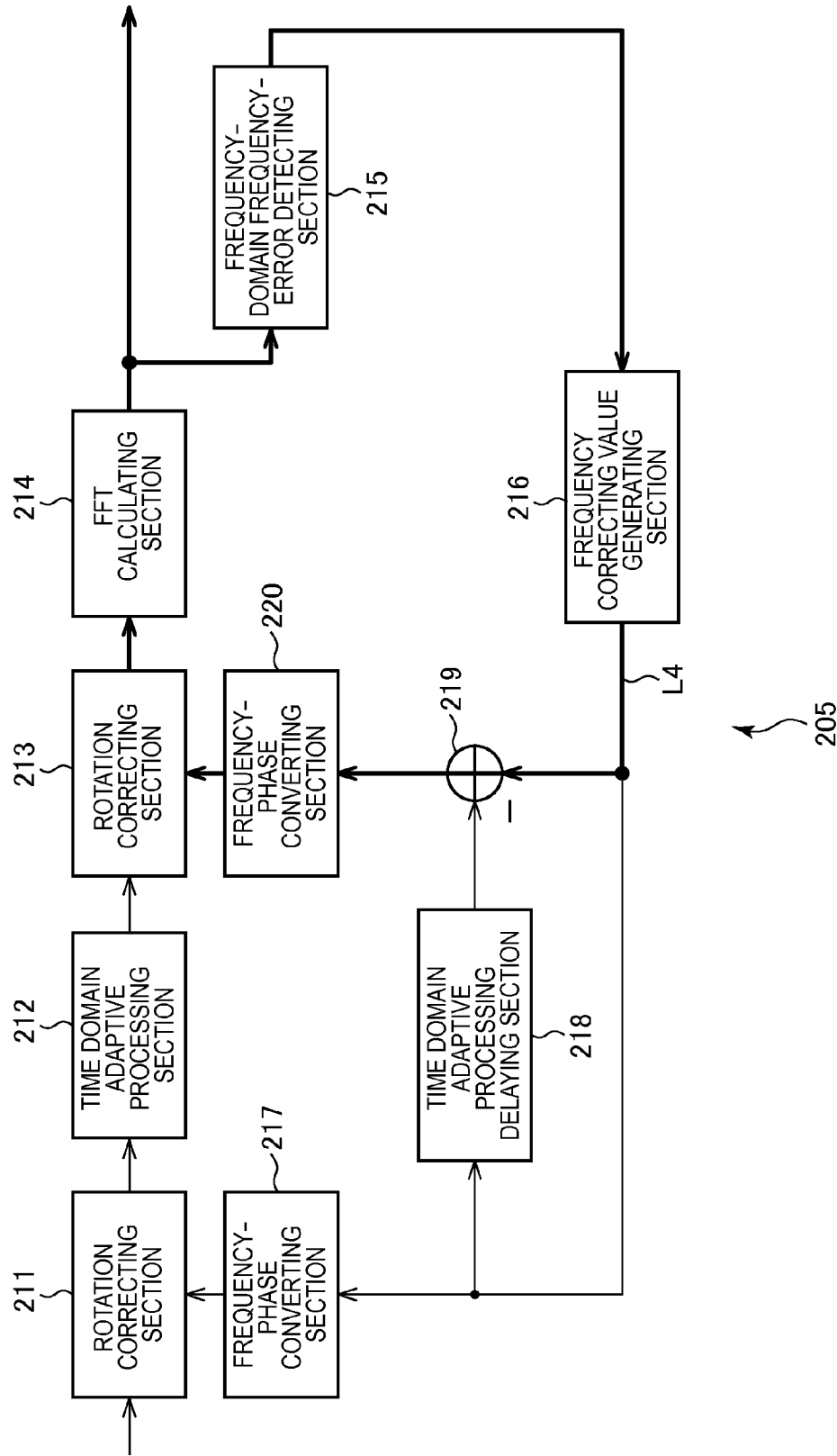
FIG. 11 is a diagram illustrating a loop delay in the case where the time domain adaptive processing is in a substantially ineffective state.

In contrast, in the case where the time domain adaptive processing only delays an input OFDM signal and is in the substantially ineffective state, the correcting value that is corrected by the rotation correcting section 211 and delayed by the time domain adaptive processing section 212 is to be cancelled out by the correcting value delayed by the time domain adaptive processing delaying section 218. Therefore, in this case, as illustrated in FIG. 11, the frequency error correction loop operates with a loop delay in an inner loop L4 (thick lines in the drawing).

For example, assuming that a delay of one symbol occurs in each of the FFT calculating section 214 and the frequency-domain frequency-error detecting section 215 and that a delay of little less than two symbols occurs in the time domain adaptive processing section 212, a delay of little less than four symbols is to occur when the time domain adaptive processing is in the effective state and operates with the loop delay in the loop L3. On the other hand, when the time domain adaptive processing is in the substantially ineffective state and operates with the loop delay in the loop L4, a delay is only two symbols, and it is thus possible to restrain the deterioration of trackability with respect to frequency fluctuation, achieving fast trackability.

As described above, in the receiving device 200, in the case where the time domain adaptive processing in the time domain adaptive processing section 212 is in the substantially ineffective state, it is possible to shorten the loop delay in the frequency error correction loop.

In addition, in the case where the time domain adaptive processing in the time domain adaptive processing section 212 is changed from the effective state to the substantially ineffective state, the frequency error correction loop is to operate with the loop delay automatically switched from the loop L3 to the loop L4 by the loop properties. In addition, to the contrary, in the case where the time domain adaptive processing is changed from the substantially ineffective state to the effective state, the loop delay is to be automatically switched from the loop L4 to the loop L3.

Therefore, in the receiving device 200, at the time of shortening the loop delay in the frequency error correction loop, a process of determining the adaptation state of the time domain adaptive processing is not needed, and further a process of switching the processes is not needed, either. As a result, the receiving device 200 can output a signal subjected to predetermined signal processing while switching the loop delay seamlessly.

Note that, in the above description, there have been described the examples in which the two processing sections of the first processing section 115 and the second processing section 116 are provided in the signal processing device 100, but one or more than two processing sections may be provided.

In addition, the embodiment of the present technology is not limited to the above-described embodiment, and can be subjected to various modifications within a scope not deviating from the gist of the present technology.

Additionally, the present technology may also be configured as below.

(1)

A signal processing device including:

a first correction processing section that performs first correction on a predetermined signal;

an adaptive processing section that performs predetermined adaptive processing on the signal that has been subjected to the first correction; and a second correction processing section that performs second correction, which is reverse correction of the first correction, on the signal that has been subjected to the adaptive processing, in accordance with the amount of delay in the adaptive processing.

(2)

The signal processing device according to (1), wherein the first correction processing section, the adaptive processing section, and the second correction processing section are disposed in an identical feedback loop, and the amount of delay in the feedback loop is adjusted according to an adaptation state in the adaptive processing.

(3)

The signal processing device according to (2), further including one or more processing sections each of which performs predetermined signal processing, wherein the processing sections are disposed in the feedback loop.

(4)

The signal processing device according to (2) or (3), wherein in a case where the adaptive processing does not include manipulation processing of the signal, the amount of delay in the feedback loop is shortened as compared with a case where the adaptive processing includes the manipulation processing of the signal.

(5)

A signal processing method performed by a signal processing device, the method including the steps of:

performing first correction on a predetermined signal;

performing predetermined adaptive processing on the signal that has been subjected to the first correction, and performing second correction, which is reverse correction of the first correction, on the signal that has been subjected to the adaptive processing, in accordance with the amount of delay in the adaptive processing.

(6)

A receiving device including:

a first correction processing section that performs first frequency correction on an orthogonal frequency division multiplexing (OFDM) signal;

a time domain adaptive processing section that performs time domain adaptive processing, which is adaptive processing in a time domain, on the OFDM signal that has been subjected to the first frequency correction; and a second correction processing section that performs second frequency correction, which is reverse correction of the first frequency correction, on the OFDM signal that has been subjected to the time domain adaptive processing, in accordance with the amount of delay in the time domain adaptive processing.

(7)

The receiving device according to (6), wherein the first correction processing section, the time domain adaptive processing section, and the second correction processing section are disposed in an identical feedback loop, and the amount of delay in the feedback loop is adjusted according to an adaptation state in the time domain adaptive processing.

(8)

The receiving device according to (7), further including:

an FFT calculating section that converts the OFDM signal that has been subjected to the second correction processing from a time domain into a frequency domain;

a frequency-domain frequency-error detecting section that detects a frequency error in the frequency domain contained in the OFDM signal; and a frequency correcting value generating section that generates a frequency correcting value in accordance with the detected frequency error, wherein the FFT calculating section, the frequency-domain frequency-error detecting section, and the frequency correcting value generating section are disposed in the feedback loop, and the first correction processing section performs the first frequency correction on the basis of the generated frequency correcting value.

(9)

The receiving device according to (7) or (8), wherein in a case where the time domain adaptive processing does not include the adaptive processing in the time domain on the OFDM signal, the amount of delay in the feedback loop is shortened as compared with a case where the time domain adaptive processing includes the adaptive processing in the time domain on the OFDM signal.

(10)

A receiving method performed by a receiving device, the method including the steps of:

performing first frequency correction on an OFDM signal;

performing time domain adaptive processing, which is adaptive processing in a time domain on the OFDM signal that has been subjected to the first frequency correction; and performing second frequency correction, which is reverse correction of the first frequency correction, on the OFDM signal that has been subjected to the time domain adaptive processing, in accordance with the amount of delay in the time domain adaptive processing.

REFERENCE SIGNS LIST 100 signal processing device
111 adder
112 adaptive processing section
113 adder
114 adder
115 first processing section
116 second processing section
117 delay processing section
200 receiving device
201 antenna
202 tuner
203 A/D converting section
204 quadrature demodulating section
205 FFT section
206 equalizing section
207 decoder
208 outputting section
211 rotation correcting section
212 time domain adaptive processing section
213 rotation correcting section
214 FFT calculating section
215 frequency-domain frequency-error detecting section
216 frequency correcting value generating section
217 frequency-phase converting section
218 time domain adaptive processing delaying section
219 adder
220 frequency-phase converting section

The invention claimed is:

1. A signal processing device comprising:
a first correction processing section configured to perform first correction on a first signal to obtain a second signal;
an adaptive processing section configured to perform adaptive processing on the second signal to obtain a third signal and to be selectively put in either an effective state in which it performs manipulation processing on the second signal to obtain the third signal or a substantially ineffective state in which it does not perform manipulation processing on the second signal and only delays the third signal with respect to the second signal; and
a second correction processing section configured to perform second correction, which is reverse correction of the first correction, on the third signal, in accordance with an amount of delay in the adaptive processing, to obtain a fourth signal, the second correction processing section being configured to perform the second correction such that, if the adaptive processing section is in the effective state, the fourth signal is different than the first signal, and, if the adaptive processing section is in the substantially ineffective state, the fourth signal is substantially the same as the first signal.

2. The signal processing device according to claim 1, wherein
the first correction processing section, the adaptive processing section, and the second correction processing section are disposed in a feedback loop, and
the first correction processing section, the adaptive processing section, and the second correction processing section are configured such that an amount of loop delay in the feedback loop is adjusted when an adaptation state of the adaptive processing section is changed from the effective state to the ineffective state.

3. The signal processing device according to claim 2, further comprising
one or more additional processing sections each configured to perform predetermined signal processing,
wherein the one or more additional processing sections are disposed in the feedback loop.

4. The signal processing device according to claim 3, wherein
the first correction processing section, the adaptive processing section, and the second correction processing section are configured such that, in a case where the adaptive processing section is in the substantially ineffective state and does not perform the manipulation processing of the second signal, the amount of loop delay in the feedback loop is shortened as compared with a case where the adaptive processing section is in the effective state and performs the manipulation processing of the second signal.

5. A signal processing method performed by a signal processing device, the method comprising the steps of:
performing first correction on a first signal to obtain a second signal;
at a first time, performing effective adaptive processing on the second signal to obtain a third signal by performing manipulation processing on the second signal to obtain the third signal;
at a second time, performing substantially ineffective adaptive processing on the second signal to obtain the third signal by not performing manipulation processing on the second signal and only delaying the third signal with respect to the second signal; and
performing second correction, which is reverse correction of the first correction, on the third signal at each of the first and second times, in accordance with an amount of delay in the adaptive processing, to obtain a fourth signal, the second correction being performed such that, if the adaptive processing is effective, the fourth signal is different than the first signal, and, if the adaptive processing is substantially ineffective, the fourth signal is substantially the same as the first signal.

6. A receiving device comprising:
a first correction processing section configured to perform first frequency correction on a first signal comprising an orthogonal frequency division multiplexing (OFDM) signal to obtain a second signal;
a time domain adaptive processing section configured to perform time domain adaptive processing, which is adaptive processing in a time domain, on the second signal to obtain a third signal and to be selectively put in either an effective state in which it performs adaptive processing in the time domain on the second signal to obtain the third signal or a substantially ineffective state in which it does not perform adaptive processing in the time domain on the second signal and only delays the third signal with respect to the second signal; and
a second correction processing section configured to perform second frequency correction, which is reverse correction of the first frequency correction, on the third signal, in accordance with an amount of delay in the time domain adaptive processing, to obtain a fourth signal, the second correction being performed such that, if the time domain adaptive processing section is in the effective state, the fourth signal is different than the first signal, and, if the time domain adaptive processing section is in the substantially ineffective state, the fourth signal is substantially the same as the first signal.

7. The receiving device according to claim 6, wherein
the first correction processing section, the time domain adaptive processing section, and the second correction processing section are disposed in a feedback loop, and
the first correction processing section, the time domain adaptive processing section, and the second correction processing section are configured such that an amount of loop delay in the feedback loop is adjusted when an adaptation state of the time domain adaptive processing section is changed from the effective state to the ineffective state.

8. The receiving device according to claim 7, further comprising:
an FFT calculating section configured to convert the fourth signal from a time domain into a frequency domain to obtain a fifth signal;
a frequency-domain frequency-error detecting section configured to detect a frequency error in the fifth signal; and
a frequency correcting value generating section configured to generate a frequency correcting value in accordance with the detected frequency error, wherein
the FFT calculating section, the frequency-domain frequency-error detecting section, and the frequency correcting value generating section are disposed in the feedback loop, and
the first correction processing section is configured to perform the first frequency correction on the basis of the generated frequency correcting value.

9. The receiving device according to claim 8, wherein
the first correction processing section, the time domain adaptive processing section, and the second correction processing section are configured such that, in a case where the time domain adaptive processing section is in the substantially ineffective state and does not perform the adaptive processing in the time domain on the second signal, the amount of loop delay in the feedback loop is shortened as compared with a case where the time domain adaptive processing section is in the effective state and performs the adaptive processing in the time domain on the second signal.

10. A receiving method performed by a receiving device, the method comprising the steps of:
performing first frequency correction on a first signal comprising an OFDM signal to obtain a second signal;
at a first time, performing effective time domain adaptive processing, which is adaptive processing in a time domain on the second signal to obtain a third signal by performing manipulation processing on the second signal to obtain the third signal;
at a second time, performing substantially ineffective time domain adaptive processing on the second signal to obtain the third signal by not performing manipulation processing on the second signal and only delaying the third signal with respect to the second signal; and
performing second frequency correction, which is reverse correction of the first frequency correction, on the third signal at each of the first and second times, in accordance with an amount of delay in the time domain adaptive processing, to obtain a fourth signal, the second frequency correction being performed such that, if the adaptive processing is effective, the fourth signal is different than the first signal, and, if the adaptive processing is substantially ineffective, the fourth signal is substantially the same as the first signal.

* * * * *